United States Patent [19]

Offermann

[11] Patent Number: 4,564,747
[45] Date of Patent: Jan. 14, 1986

[54] METHODS AND APPARATUS FOR DETECTING ABNORMALITIES IN PROXIMITY EFFECT HEAT-TRACING CIRCUITS

[75] Inventor: Paul F. Offermann, Redwood City, Calif.

[73] Assignee: Chevron Research Company, San Francisco, Calif.

[21] Appl. No.: 537,995

[22] Filed: Sep. 30, 1983

[51] Int. Cl.[4] .......................... H05B 1/02; H02H 3/16
[52] U.S. Cl. .................................. 219/482; 219/301; 219/300; 219/503; 361/45; 361/57; 361/87; 324/51
[58] Field of Search ............... 219/503, 300, 301, 497, 219/499, 482; 361/44–46, 57, 87; 324/51, 52

[56] References Cited

U.S. PATENT DOCUMENTS

| 3,571,561 | 3/1971 | Ando. | |
|---|---|---|---|
| 3,801,871 | 4/1974 | Loh | 361/45 |
| 3,857,069 | 12/1974 | Howell | 361/45 |
| 4,200,897 | 4/1980 | Dawley | 361/45 |
| 4,316,229 | 2/1982 | Helwig, Jr. | 361/45 |
| 4,392,174 | 7/1983 | Cadet et al. | 361/45 |

Primary Examiner—M. H. Paschall
Attorney, Agent, or Firm—Edward J. Keeling

[57] ABSTRACT

Methods and apparatus for detecting abnormalities in proximity effect pipeline tracing circuits by coupling conductive elements carrying proximity effect circuit currents and having opposite polarities. These conductive elements are coupled to an additional conductive element which is in turn connected to a system for detecting current so that when the difference between the proximity effect circuit currents is non-zero, the current flows through the additional conductive element and is detected by a relay or ammeter.

16 Claims, 2 Drawing Figures

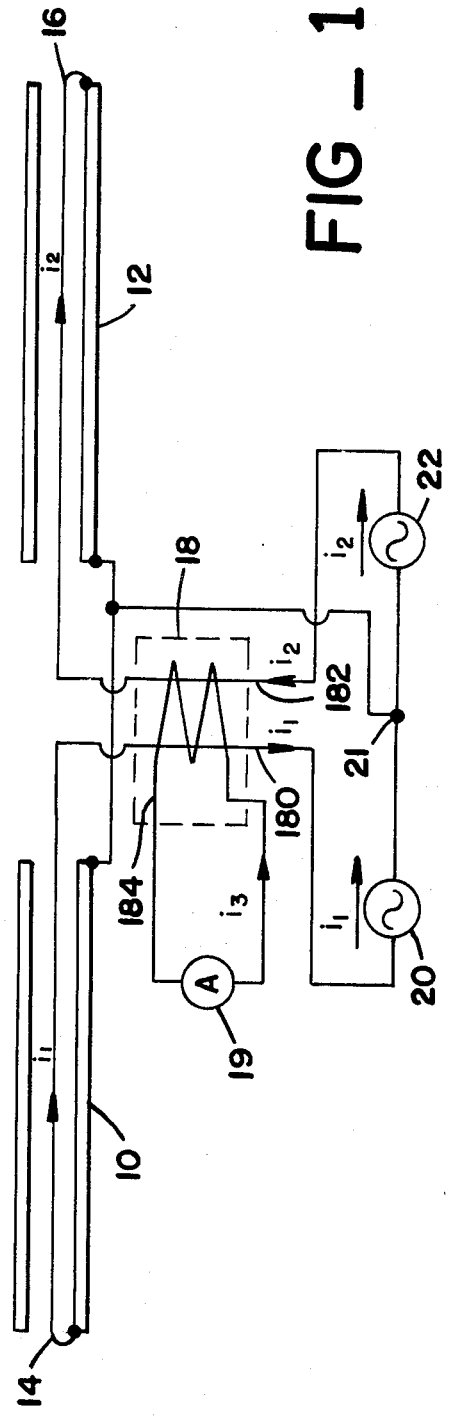
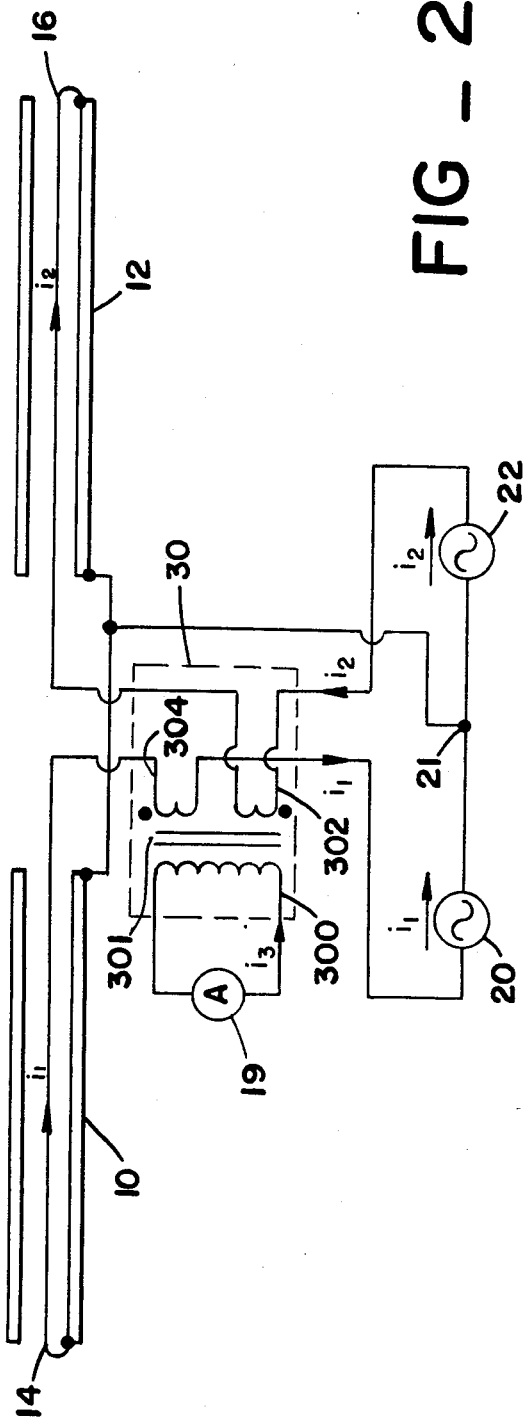

METHODS AND APPARATUS FOR DETECTING ABNORMALITIES IN PROXIMITY EFFECT HEAT-TRACING CIRCUITS

BACKGROUND OF THE INVENTION

The present invention pertains in general to methods and apparatus for proximity effect heat-tracing and, in particular, to methods and apparatus for detecting abnormalities in proximity effect heat-tracing circuits.

Viscous fluids, particularly heavy oil and molten sulfur, are often most conveniently transported by pipelines. Movement of viscous fluids through such pipelines is facilitated by maintaining the fluids at an elevated temperature. Steam- or electrically-heated tracer pipes are commonly welded to pipelines in order to maintain the pipelines at temperatures above the ambient temperature.

One type of electrical heating used in long distance pipelines is proximity effect heating. Proximity effect heating is a form of impedance heating in which an insulated conductor is passed through the interior of a ferromagnetic pipe called a heat tube. An alternating current power source is connected between a first end of the heat tube and a first end of the conductor while a second end of the heat tube is connected to a second end of the conductor. Current flows from the power source through the conductor to the second end of the conductor and returns through the heat tube. Heat is generated by the $I^2R$ loss of the return current flow, by hysteresis and eddy currents induced within the heat tube wall by the alternating magnetic field around the insulated conductor, and by the $I^2R$ loss in the insulated conductor.

By a process of electromagnetic induction, the current in the insulated conductor causes the return current to concentrate at the inner surface of the heat tube which is the surface of the tube nearest to the conductor. This phenomenon of current concentration is properly referred to as the proximity effect, although the term "skin effect" is often applied.

The current density declines sharply from the inner to outer surface of the heat tube, so that no significant current flows at the outer surface.

In order to detect abnormal operation, a proximity effect circuit is divided in two parts, according to U.S. Pat. No. 3,571,561. A current transformer is inserted into the circuit for each of the parts. Both of the current transformers are connected to apparatus which detects a current corresponding to a difference between the current in the two parts. Deviations from a normal difference between the currents in the two parts signal abnormalities, which may include breakdown of the insulation of the insulated conductor or an abnormal elevation in temperature in one of the parts.

Because of the expense of the high current, high voltage equipment employed, it is desirable to minimize the amount of detection apparatus required.

SUMMARY OF THE INVENTION

Accordingly, it is an object of the present invention to provide a new and improved apparatus for detecting abnormalities in proximity effect pipeline tracing circuits.

It is a further object to the present invention to provide new and improved methods for detecting abnormalities in proximity effect pipeline tracing circuits.

Among the advantages of the present invention, is a reduction in the amount of the equipment required at each location where abnormalities are to be detected.

These and other objects and advantages of the present invention will become apparent to those skilled in the art upon consideration of the accompanying specification, claims and drawings.

In order to attain the above-mentioned and other objects and advantages, the apparatus of the present invention involves detecting abnormalities in proximity effect pipeline heat-tracing circuits. The apparatus of the present invention comprises a first source of alternating current connected to a second source of alternating current of the same voltage phase as the first source to form a node. A first proximity effect heat-tracing segment has an insulated conductor and has a heat tube which is connected both to the node and to the insulated conductor of the first proximity effect tracing segment. A second proximity effect heat-tracing segment has a heat tube connected to the node and also has an insulated conductor connected to the heat tube of the second proximity effect heat-tracing segment. A current transformer has a first conductive element connected between the insulated conductor of the first proximity effect heat-tracing segment and the first source. The current transformer has a second conductive element which is opposite in polarity to the first conductive element, which is coupled to the first conductive element and which is connected between the insulated conductor of the second tracing segment and the second source. In addition, the current transformer has a third conductive element coupled to the first and second conductive elements. Means for detecting current is connected to the third conductive element so that any difference between the currents flowing through the first conductive element and the second conductive element is detected as the current flowing through the third conductive element.

A first method for detecting abnormalities in a proximity effect pipeline tracing circuit involves a first segment capable of carrying a first current, having a first heat tube and having a first insulated conductor within the first heat tube, further involves a second segment capable of carrying a second current, having a second heat tube and having a second insulated conductor within the second heat tube. The first method comprises the steps of passing a first conductor through a window of a window-type current transformer and connecting the first conductor between the first segment and the first current source current. A second conductor of the window-type current transformer is connected between the second segment and a second current source and is passed through the window of the window-type current transformer. The second conductor is coupled to the first conductor so that the second conductor is opposite in polarity with respect to the first conductor. The first current source is connected to the second current source and both current sources are connected to the first proximity effect heat-tracing segment and to the second proximity effect heat-tracing segment. Means for detecting a current is connected to a winding of the window-type current transformer. A signal indicative of a normal proximity effect pipeline heat-tracing circuit is established, and abnormalities in the proximity effect pipeline heat-tracing circuits are displayed as a deviation from the normal signal.

A second method for detecting abnormalities in the proximity effect pipeline heat-tracing circuit involves a first segment capable of carrying a first current, having a first heat tube and having a first insulated conductor within the first heat tube. The pipeline tracing circuit also has a second segment capable of carrying a second current, having a second heat tube and having a second insulated conductor within the second heat tube. The second method comprises the steps of connecting a first primary winding of a dual primary current transformer between the first segment and the first current source and connecting a second primary winding of the dual primary transformer between the second segment and a second current source. The second primary winding is coupled to the first primary winding so that the second primary winding is opposite in polarity to the first primary winding. The first current source is connected to the second current source and both current sources are connected to the first and to the second segment. Means for detecting a difference between the first and second currents is connected to a secondary winding of the dual primary transformer. A signal indicative of a normal proximity effect pipeline heat-tracing circuit is established. Abnormalities in proximity effect pipeline heat-tracing circuits are displayed as a deviation from the normal signal.

BRIEF DESCRIPTION OF THE DRAWINGS

FIG. 1 is a schematic diagram of a first proximity effect heat-tracing apparatus according to the present invention; and FIG. 2 is a schematic diagram of a second proximity effect heat-tracing apparatus embodying the present invention.

DESCRIPTION OF THE PREFERRED EMBODIMENTS

A first embodiment of the apparatus according to the present invention is illustrated in FIG. 1. In FIG. 1, a heat-tracing pipe and current abnormality detecting apparatus are schematically depicted, while the fluid carrying pipeline to which the heat-tracing pipe would normally be attached is omitted for the sake of clarity. Likewise, switches, fuses, and other apparatus, commonly associated with proximity effect heat-tracing circuits have been omitted for the sake of clarity, but it would be obvious to one skilled in the art to supply them as required.

In FIG. 1, two lengths of pipe, heat tubes 10 and 12, and delimit two tracing segments. Insulated conductor 14 is connected to heat tube 10 at a first end, runs within heat tube 10 and passes without heat tube 10 at a second end. Similarly, an insulated conductor 16 is connected to heat tube 12 at a first end, runs within heat tube 12 and passes without heat tube 12 at a second end.

A window-type current transformer 18 has a first conductor 180, a second conductor 182 electromagnetically coupled to conductor 180 and a winding 184 electromagnetically coupled to both conductor 180 and to conductor 182.

A first terminal of a first alternating current source 20 is connected to a first terminal of a second alternating current source 22 at a node 21. A second terminal of alternating current source 20 is connected to a first end of conductor 180, a second end of which is connected to insulated conductor 14. A second terminal of alternating current source 22 is connected to a first end of conductor 182, a second end of which is connected to insulated conductor 16. The second ends of heat tubes 10 and 12 are connected to node 21.

A first terminal of a current detecting apparatus 19 is connected to a first end of winding 184. A second terminal of current detecting apparatus 19 is connected to a second end of winding 184.

Currents $i_1$ and $i_2$ are indicated in FIG. 1 by arrows which are representative of current flow during a portion of the alternating current cycle in the embodiment of FIG 1.

Heat tubes 10 and 12 are ferromagnetic tubes and insulated conductors 14 and 16 are insulated cables of sorts which are well known and readily available to those skilled in the art. Alternating current power sources 20 and 22 may be separate source transformers, separate secondary windings within a single source transformer or separate parts of a single, center-tapped secondary winding within a single source transformer. Current detecting apparatus 19 may be a common ammeter. Transformer 18 may be a window-type current transformer of a sort readily constructed by one skilled in the art. Conductors 180 and 182 and winding 184 represent conductive elements within window transformer 18.

As is clear to one skilled in the art, an aspect of the present invention is that conductors of opposite polarity and carrying currents $i_1$ and $i_2$ be inductively coupled within transformer 18, so that a current $i_3$ is only induced in winding 184 when there is a non-zero difference between $i_1$ and $i_2$.

Thus, assuming the same uniform resistance throughout heat pipes 10 and 12, by selecting voltages 20 and 22 to be respectively proportional to the lengths of heat pipes 10 and 12 and by selecting pipes 10 and 12 to have a common diameter and thickness, $i_1$ equals $i_2$. Under these conditions, an abnormality in insulation around either of insulated conductors 14 and 16 is detected by device 19 as a flow of current $i_3$. Normality is indicated by $i_3 = 0$.

In FIG. 2, in which elements common to FIG. 1 are identified by the same reference numerals used to identify them in FIG. 1, an alternative embodiment according to the apparatus of the present invention is illustrated. A dual primary current transformer 30 has a first primary winding 302 connected between a first end of insulated conductor 16 and a second end of alternating current source 22. A second primary winding 304 is connected between a first end of insulated conductor 14 and the second end of alternating current source 20. Also contained within the dual primary transformer 30 is a secondary winding 300, across which is connected current detecting apparatus 19. Windings 302 and 304 are electromagnetically coupled to each other and to winding 300 through a core 301.

Again, by the appropriate selection of lengths for heat tubes 10 and 12 and voltages from sources 20 and 22, current $i_3$ only flows when $i_1$ does not equal $i_2$ and indicates that an abnormality is present.

While the present invention has been described in terms of preferred embodiments, further modifications and improvements will occur to those skilled in the art.

For example, device 19 need not be an ammeter but may be any current-detecting device such as a relay which triggers a circuit breaker to open the circuits of both proximity effect heat-tracing segments if an abnormal curent flows through device 19. As another example, devive 19 may be an alarm.

I desire it to be understood, therefore, that this invention is not limited to the particular form shown and that I intend in the appended claims to cover all such equivalent variations which come within the scope of the invention as claimed.

What is claimed is:

1. Apparatus for detecting current flow abnormalities in either of a pair of proximity-effect pipeline heat-tracing circuits for heating at least two serially connected pipeline sections, comprising:
   a first source of alternating current for heating one of said pipeline sections;
   a second source of alternating current for heating the other of said pipeline sections, said second source having the same voltage phase as said first source and having one output terminal connected to one output terminal of said first source to form a current node;
   a first proximity effect heat-tracing segment in heat-exchange relation with one of said pipeline sections, said first segment including a first elongated insulated conductor extending through and surrounded by a first heat tube, said first heat tube having one end connected to said node and the other end connected to one end of said first insulated conductor;
   a second proximity effect heat-tracing segment in heat-exchange relation with the other of said pipe sections, said second segment including a second elongated insulated conductor extending through and surrounded by a second heat tube, said second heat tube having one end connected to said node and the other end connected to one end of said second insulated conductor;
   a single current transformer having (1) a first conductive element connected between said first alternating current source and the other end of said first insulated conductor extending through said first heat-tracing tube segment and (2) a second conductive element with opposite polarity to said first conductive element connected between said second alternating current source and the other end of said second insulated conductor extending through said second heat-tracing tube segment, and (3) a third conductive element inductively coupled to both said first and said second conductive elements; and
   means for detecting current flow induced in said third conductive element by any difference between the currents flowing through said first conductive element and said second conductive element whereby abnormal current flow and unequal generation of heat in one of said heat-tracing segments relative to the other of said heat-tracing segments is detected by said current flow.

2. The apparatus as recited in claim 1 wherein said transformer is a window-type current transformer, and said first conductive element comprises a first conductor passing through the window of said transformer, said second conductive element comprises a second conductor through said window and said third conductive element comprises a winding forming a portion of said window to detect unbalanced current flow between said first and second conductive elements.

3. The apparatus as recited in claim 2 wherein said means for detecting current flow comprises an ammeter.

4. The apparatus as recited in claim 2 wherein said means for detecting current flow comprises a relay coupled to a circuit breaker.

5. The apparatus as recited in claim 1 wherein said first conductive element comprises a first primary winding of said single current transformer, said second conductive element comprises a second primary winding of said current transformer and said third conductive element comprises a secondary winding of said transformer.

6. The apparatus as recited in claim 5 wherein said means for detecting current flow comprises an ammeter.

7. The apparatus as recited in claim 5 wherein said means for detecting current flow comprises a relay coupled to a circuit breaker.

8. The apparatus as recited in claim 1 wherein said means for detecting current flow comprises an ammeter.

9. The apparatus as recited in claim 8 wherein said single current transformer is a window-type transformer, and said first conductive element comprises a first conductor passing through the window of said transformer, said second conductive element comprises a second conductor through said window and said third conductive element comprises a winding forming a portion of said window to detect unbalanced current flows between said first and second conductive elements during current flow through said window.

10. The apparatus as recited in claim 8 wherein said first conductive element comprises a first primary winding of said window-type current transformer, said second conductive element comprises a second primary winding of said current transformer and said third conductive element comprises a secondary winding of said current transformer.

11. The apparatus as recited in claim 1 wherein said means for detecting current flow comprises a relay coupled to a circuit breaker.

12. The apparatus as recited in claim 11 wherein said transformer is a current transformer, said first conductive element comprises a first primary winding of said current transformer, said second conductive element comprises a second primary winding of said current transformer and said third conductive element comprises a secondary winding of said current transformer for detecting differences in current flow between said first and second primary windings.

13. A method for detecting current flow abnormalities in either of a pair of proximity-effect pipeline heat-tracing circuits for heating two serially connected pipeline sections comprising a first heat-tracing segment capable of carrying a first current to heat one of said pipeline sections by heat exchange therewith, said first segment including a first heat tube having a first insulated conductor extending therethrough and further comprising a second heat-tracing segment capable of carrying a second current to heat the other of said pipeline sections by heat exchange therewith, said second segment including a second heat tube having a second insulated conductor extending therethrough comprising the steps of:
   passing an alternating current from one source through a first conductor traversing a window of a single window-type current transformer to said first insulated conductor extending through said tube of said first heat-tracing segment;
   passing an alternating current from a second source through a second conductor traversing the window of said single window-type current transformer to said second insulated conductor extending through said tube of said second heat-tracing segment coupling said second conductor and said first conductor so that current flow in said second conductor is opposite in polarity with respect to current flow in said first conductor;

connecting in common one of the terminals of said first current source with one of the terminals of said second current source and connecting both of said terminals to an end of both said first and said second heat-tracing segment tubes, said ends being remote from the connection between the end of each of said insulated conductors and the other end of each of said heat-tracing tubes; and detecting a current flow induced in a winding of said window-type current transformer as an indication of abnormal current flow in one of said heat tracing segments relative to the other segment.

14. The method as recited in claim 13 further comprising the steps of:

establishing a signal for detecting a current indicative of a normal proximity effect heat-tracing current flow through said first and second conductors through said transformer; and displaying abnormalities in the proximity effect pipeline heat-tracing current flow as a deviation from said normal signal.

15. A method for detecting current flow abnormalities in either of a pair of proximity-effect pipeline heat-tracing circuits for heating two serially connected pipeline sections comprising a first heat-tracing segment capable of carrying a first current to heat one of said pipeline sections by heat exchange therewith, said first segment including a first heat tube having a first insulated conductor extending therethrough and further comprising a second heat-tracing segment capable of carrying a second current to heat the other of said pipeline sections by heat exchange therewith, said second segment including a second heat tube having a second insulated conductor extending therethrough comprising the steps of:

flowing an alternating current from a first source through a first primary winding of a single dual primary current transformer to an insulated conductor extending through said first heat-tracing segment tube;

flowing another alternating current from a second source through a second primary winding of said single dual primary current transformer to an insulated conductor extending through a second heat-tracing segment tube;

coupling said second primary winding and said first primary winding so that current flow in said second primary winding is opposite in polarity to current flow in said first primary winding;

connecting one terminal of said first current source to one terminal of said second current source and in common with the end of both said first and said second heat-tracing segment tubes and opposite to the ends of said segment tubes connected to the opposite end of the respective insulated conductors connected to said first and second primary windings, and detecting a difference between the first and second primary winding currents induced in a secondary winding of said dual primary current transformer to indicate abnormal current flow in either of said heat-tracing segments relative to the other segment.

16. The method as recited in claim 15 further comprising the steps of:

establishing a signal from the current flow in said secondary winding indicative of a normal heat-tracing circuit; and displaying abnormalities in the proximity effect pipeline heat-tracing current flow as a deviation from said normal signal.

* * * * *